United States Patent
Kotlarski

(10) Patent No.: US 6,668,419 B1
(45) Date of Patent: Dec. 30, 2003

(54) WIPER BLADE FOR GLASS SURFACES OF MOTOR VEHICLES

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 09/869,223

(22) PCT Filed: Aug. 30, 2000

(86) PCT No.: PCT/DE00/02951

§ 371 (c)(1),
(2), (4) Date: Jun. 25, 2001

(87) PCT Pub. No.: WO01/30618

PCT Pub. Date: May 3, 2001

(30) Foreign Application Priority Data

Oct. 26, 1999 (DE) .......................... 199 51 363

(51) Int. Cl.[7] .................................. B60S 1/38
(52) U.S. Cl. ................. 15/250.43; 15/250.32; 15/250.451
(58) Field of Search ........... 15/250.43, 250.44, 15/250.451, 250.452, 250.453, 250.454, 250.361, 250.32

(56) References Cited

U.S. PATENT DOCUMENTS 3,707,741 A * 1/1973 Roberts ................ 15/250.454

FOREIGN PATENT DOCUMENTS

| DE | 28 53 487 | | 7/1980 | |
| DE | 197 29 864 A | | 1/1999 | |
| EP | 0 012 251 A | | 6/1980 | |
| EP | 0 464 507 A | | 4/1995 | |
| FR | 1446657 | * | 6/1966 | ............ 15/250.452 |

* cited by examiner

Primary Examiner—Gary K. Graham
(74) Attorney, Agent, or Firm—Michael J. Striker

(57) ABSTRACT

The invention relates to a wiper blade (10) for motor vehicle windows. The wiper blade includes a rubber-elastic wiper strip (20) stretched out long in the manner of a band that can be placed against the window with a wiper lip, the two side walls of which each include a longitudinal groove (28, 30) which is situated in a plane that is basically parallel to the window (14) and has clearance from the window, so that a bridge (34) remains between the two grooves, and a spring (36 and/or 38) is accommodated in each longitudinal groove-that belongs to a spring-elastic carrier element (12) stretched out long in the manner of a band. Retention of the required flexibility of the wiper blade even with problematic window configurations is ensured when the distance (44) between the facing longitudinal edges (40, 42) of the two springs (36, 38) is greater than the width (46) of the bridge (34).

10 Claims, 4 Drawing Sheets

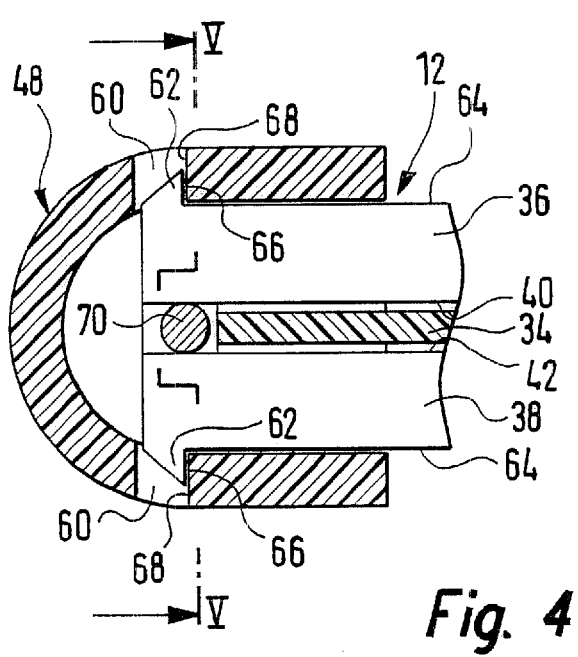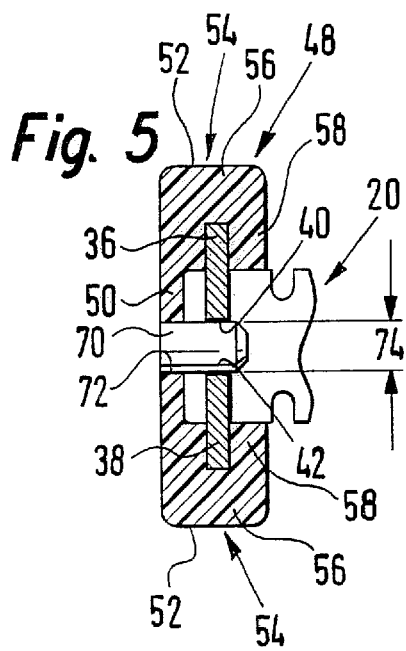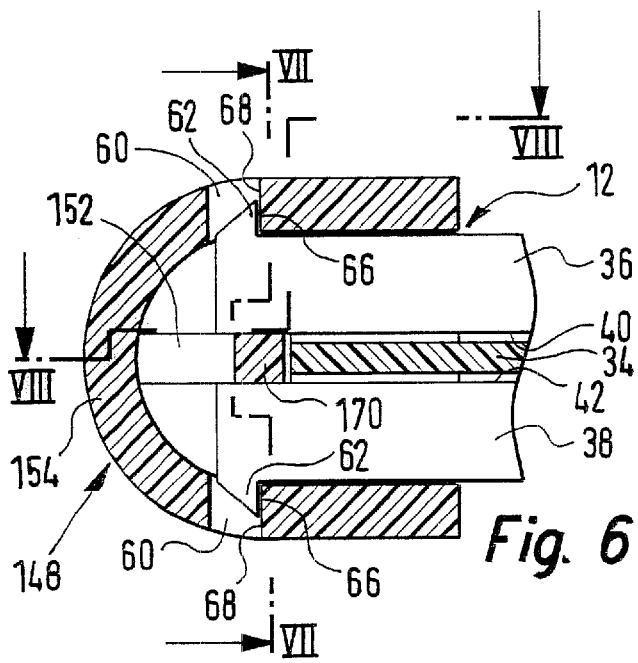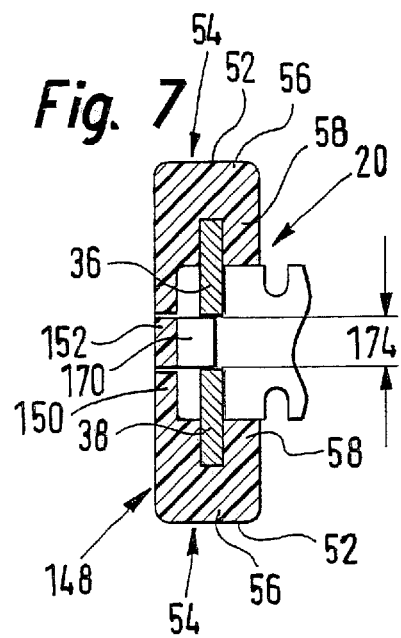

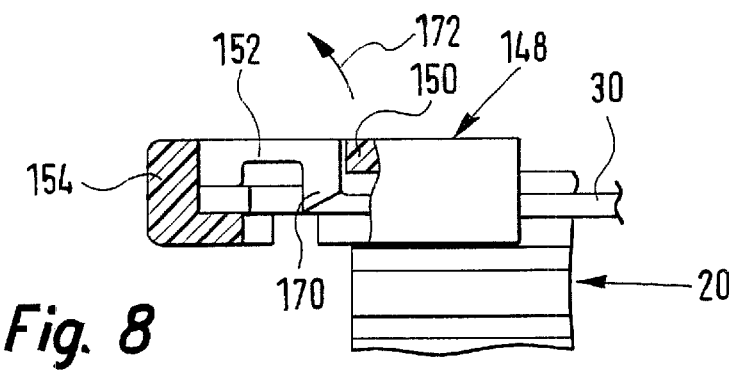
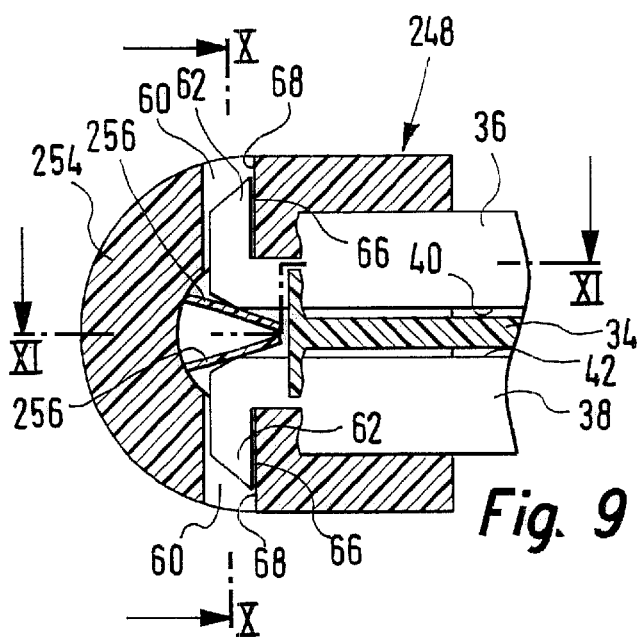
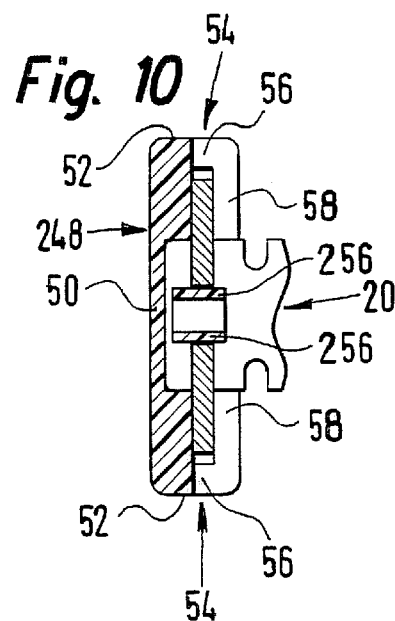
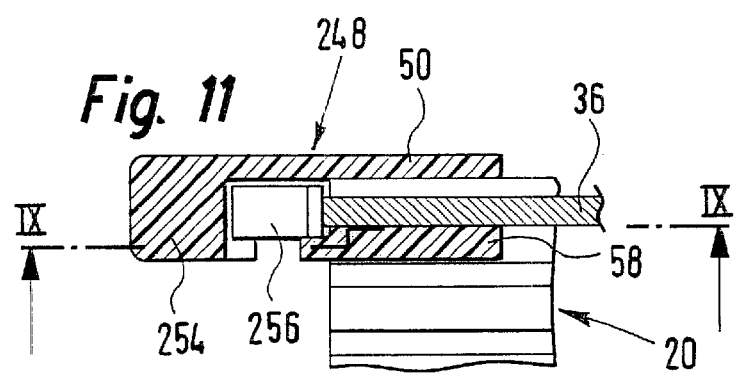

WIPER BLADE FOR GLASS SURFACES OF MOTOR VEHICLES

BACKGROUND OF THE INVENTION

The invention is based on a wiper blade. In a known wiper blade of this type (DE 2 853 487 A1), the facing longitudinal edges of the springs lie against the base of the respective longitudinal groove—i.e., on the bridge—and are held in this position by way of claws of rack parts of the wiper blade that encompass the outer edges of the springs. As a result of this measure, a certain stiffening of the bridge is achieved, which can impair the fit of the wiper blade to the window curvature. Moreover, due to the stiffening of the bridge mentioned previously, the wiper strip tips out of its working dragging position into its other working dragging position while the working direction of the wiper blade changes, causing an undesired loud noise.

SUMMARY OF THE INVENTION

In the wiper blade according to the invention the springs can also move in their longitudinal grooves transversely to their longitudinal span if the bridge deforms when stressed accordingly. This prevents stiffening of the bridge and improves the fit of the wiper strip to the window curvature, and a quieter wiper operation is achieved as a result of the coupling of noise achieved in this manner.

In a wiper blade in which at least one section of each of the two springs projects out of its longitudinal groove, whereby these sections are opposite to each other as compared with the longitudinal center line of the wiper strip, and, on at least one of these pair of sections, a component that overlaps the two springs in the manner of a bridge lies against the opposite longitudinal edges, a simple wiper blade assembly is achieved if at least one means of maintaining the clearance is situated on the component.

A practical design of the invention provides that the two end sections of the two springs project out of their grooves in the longitudinal direction and transversely to the longitudinal direction of the wiper strip, that one end cap each serving as a bridge-like component is situated on these end sections, and that means of maintaining the clearance that cooperate with the facing longitudinal edges of the springs and hold both ends of the springs in the specified position are situated on the end cap.

To secure the springs in their longitudinal grooves, the end cap has a base plate situated on the side of the springs opposite to the wiper lip which includes L-shaped projections that extend in the longitudinal direction of the springs, one L-leg each of which is connected with the base plate, and other L-legs each of which are opposite to each other, and that means of maintaining the clearance that extend between the facing longitudinal edges of the springs and that are adjacent to these are situated on the base plate. This produces a space for the springs between the one L-leg and the means of maintaining the clearance limited by the bridge in which the springs can slide in the longitudinal direction and transversely to their longitudinal span, however.

A particularly simple solution for the arrangement of the means of maintaining the clearance is produced when it is formed by a peg held on the base plate.

If the end cap is made out of a spring-elastic material and the peg is situated on a tongue of the end cap that can be moved against a retractive force out of its operating position into an assembly position, this results in simple installation and removal of the wiper blade.

According to another embodiment of the invention, the end cap includes a wall opposite to the longitudinal end edges of the springs on which the means of maintaining the clearance are situated in the longitudinal direction of the springs and extend between them. This design of the invention makes it possible to automatically install end caps that can be slid onto the springs in the longitudinal direction, because, when these end caps are installed, the means of maintaining the clearance also reach their specified position at the same time.

If these end caps are made of a spring-elastic material, and the means of maintaining the clearance are formed out of two finger-like projections of the wall that can be moved against spring force, which projections lie under tension against one of the two facing longitudinal edges of the springs in the operating position of the end cap, the manufacturing tolerances—which cannot be avoided with reasonable effort—are offset at the same time.

According to another embodiment of the invention, the bridge-like component is designed as a connecting device for a wiper arm in the middle section of the wiper blade on the side of the springs opposite to the wiper lip, which includes projections that encompass the outer longitudinal edges of the springs in claw-like fashion, whereby the means of maintaining the clearance is formed by means situated on the connecting device that grip in at least one recess of the respective springs. Although this design may be usable in and of itself, it can also be used with advantage with the embodiments of the invention—use of the end caps designed accordingly—mentioned previously.

With this other embodiment, it is appropriate that the means of maintaining the clearance is formed by separate components held on the connecting device that penetrate the springs in recesses provided there.

To secure the end caps on the end sections of the springs, a shoulder that points toward its other end section is situated on each end section of each spring on their opposite ends, to which a counter-shoulder of the end cap is assigned that cooperates with this. When the wiper blade is installed, the shoulder and counter-shoulder cooperate in such a way that the end caps are held captive on the wiper blade. Since the positioning of the means of maintaining the clearance is achieved after the specified position of the end caps is reached, no problems are encountered when installing the end caps.

Additional advantageous further developments and designs of the invention are indicated in the following description of design examples presented in the associated drawing.

BRIEF DESCRIPTION OF THE DRAWINGS

FIG. 4 shows a sectional drawing along the line VI—VI through the unit according to FIG. 2.

FIG. 5 shows a sectional drawing through the arrangement according to FIG. 4 along the line V—V.

FIG. 6 shows a sectional drawing according to FIG. 4 through another embodiment of the invention.

FIG. 7 shows a sectional drawing along the line VII—VII through the arrangement according to FIG. 6.

FIG. 8 shows a sectional drawing along the line VIII—VIII through the arrangement according to FIG. 6.

FIG. 9 shows a sectional drawing according to FIG. 4 through a further embodiment of the invention.

FIG. 10 shows a sectional drawing along the line X—X through the arrangement according to FIG. 9.

FIG. 11 shows a sectional drawing along the line XI—XI through the arrangement according to FIG. 9.

DESCRIPTION OF THE PREFERRED EMBODIMENTS

Figure 1:
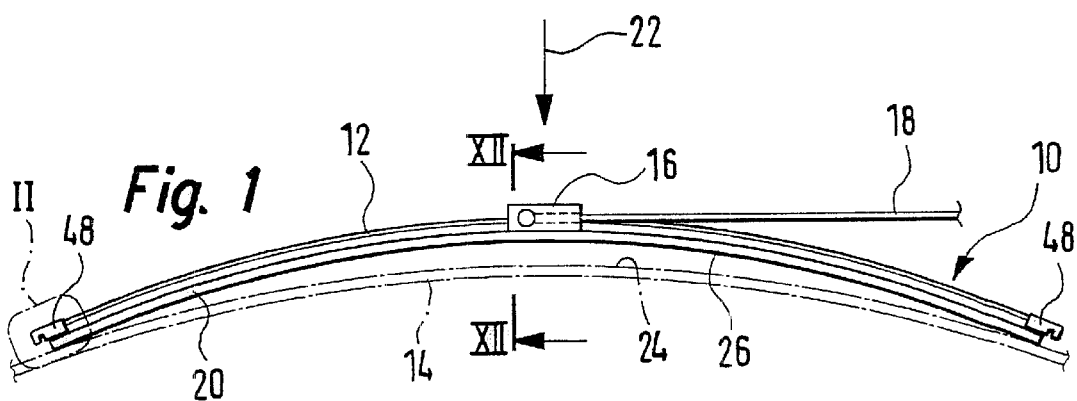
FIG. 1 shows a side view of a wiper blade situated on a wiper arm.

A wiper blade 10 shown in FIG. 1 has a multi-piece, long stretched-out, spring-elastic carrier element 12. On the top side of the carrier element 12 opposite to the window 14 to be wiped—indicated by a dash-dotted line in FIG. 1—a connecting device 16 is situated, with the help of which the wiper blade 10 can be detachably connected with a wiper arm 18 that is guided and driven on the body of a motor vehicle. A long stretched-out, rubber-elastic wiper strip 20 is situated parallel to the longitudinal axis on the underside of the carrier element 12 facing the window. The wiper arm 18 is loaded in the direction of an arrow 22 toward the window 14 to be wiped, the surface of which to be wiped is indicated with reference number 24 in FIG. 1. Since this surface 24 is intended to represent the greatest curvature of the window surface, it is clearly apparent that the curvature of the still non-loaded wiper blade 10—both ends of which lie against the window 14—is greater than the maximum window curvature. Under the contact pressure (arrow 22), the entire length of the wiper lip 26 of the wiper blade 10 lies against the window surface 24. As a result, tension builds in the band-like, spring-elastic carrier element 12 that ensures that the entire length of the wiper strip 20 and the wiper lip 26 lie against the motor vehicle window 14 properly.

Figure 2:
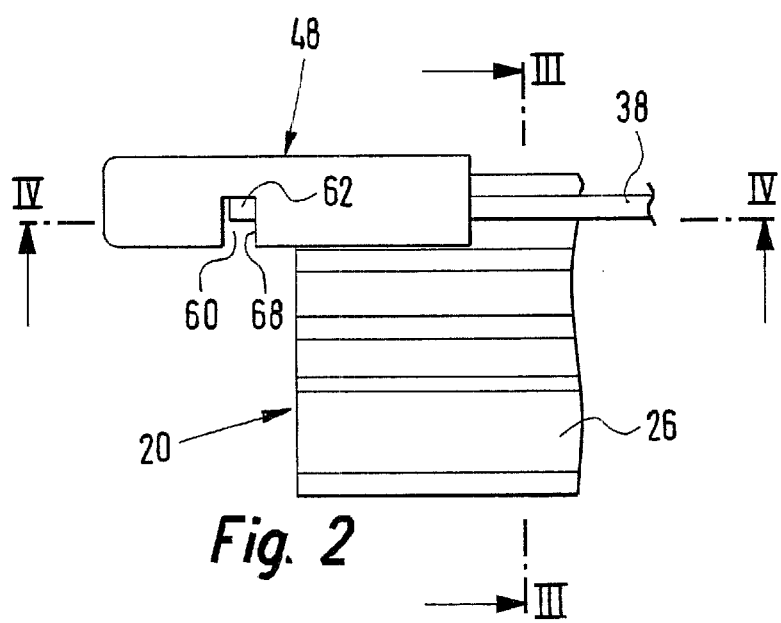
FIG. 2 shows an enlarged view of a detail labelled with "II" in FIG. 1.
Figure 3:
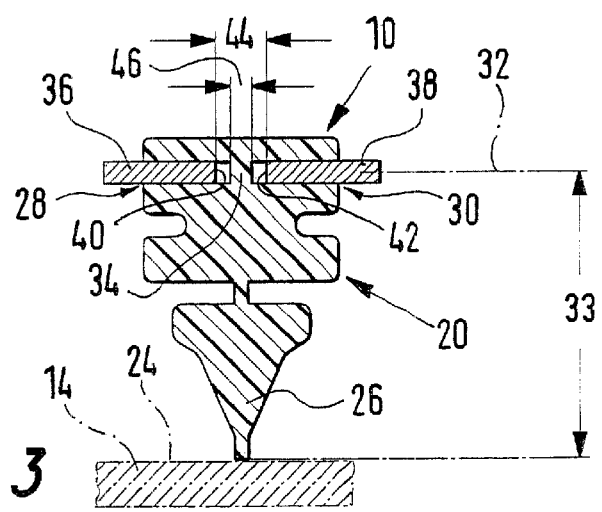
FIG. 3 shows the section of a sectional drawing along the line III—III through the arrangement according to FIG. 2.

The special design of the wiper blade 10 according to the invention will now be described in greater detail below. As shown in FIGS. 2 and 3 in particular, the wiper strip 20 of the wiper blade 10 includes two longitudinal grooves 28 and 30, each of which is open-edged toward the side walls of the wiper strip 20. Both longitudinal grooves 28 and 30 lie in a common plane—shown as a dash-dotted line in FIG. 3—that has a clearance 33 from the window 14 when the wiper blade 10 lies against the window 14. The two longitudinal grooves 28 and 30 are designed in such a way that a longitudinal intermediate bridge 34 remains between them. A band-like, long stretched-out spring 36 and/or 38 is accommodated in each of the two grooves 28 and 28. The two springs belong to the carrier element 12. The two opposite side walls of them project out of their longitudinal grooves 28 and 30. The arrangement of the two springs 38 and 38 in their longitudinal grooves 28 and 30 is designed so that their facing longitudinal edges 40 and 42 have a distance 44 between them that is greater than the width 46 of the intermediate bridge 34. As clarified further in FIG. 3, the inner longitudinal edges 40 and 42 of the springs 38 and 38 are therefore located a certain distance away from the intermediate bridge 34, so that they can also slide in their longitudinal grooves 28, 30 transversely to their longitudinal span.

The design of the wiper blade 10 described so far is also found in all special embodiments of the invention described below. As shown in a first, special embodiment of the invention in FIG. 4, the two springs 38 and 38 project out of their longitudinal grooves 28 and 30 of the wiper strip 20, viewed in the direction of their longitudinal span as well. One end cap 48 each is applied to both end sections of the springs and on the end section of the carrier element 12 so that the springs 36, 38 are held captive in their longitudinal grooves 28 and 30 (FIGS. 1 and 2). As made apparent in FIG. 5 in particular, the end cap 48 has a base plate 50 that is located on the side of the springs 36 opposite to the wiper lip 26 when the end cap is installed. The two side walls 52 of the base plate 50 include L-shaped projections 54 that extend in the longitudinal direction of the springs 36, 38, the one L-leg 56 of which is connected with the base plate 50 and the other L-legs 58 extend toward each other. As illustrated further in FIG. 5, the other two L-legs 58 grip underneath the springs 36 and 38. In the assembly position shown in FIGS. 4 and 5, the end caps 48 therefore hold the springs captive in the longitudinal grooves 28 and 30. So that the end caps cannot unintentionally get loose from this assembly position, each L-leg 56 of it has an opening 60 in which one projecting part 62 of each spring 36, 38 grips, each projecting part 62 of which is situated on the opposite outer longitudinal edges 64 of the springs 36, 38. A shoulder 66 pointing to the other end section of the wiper blade 10 is formed on each of the two projecting parts 62 to which a counter-shoulder cooperating with this is assigned on the opening 60 of the end cap 48. The size of the projecting parts 62 is to be designed so that it is smaller than the difference between the two dimensions 44 and 46 mentioned, so that the end caps 48 can be slid easily onto the carrier element 12. So that the two springs 36 and 38 reach their specified operating position (FIG. 3) again after the end caps 48 are installed and remain here during the wiping operation, each of the end caps 48 includes a separate peg 70 that, after the end cap 48 is installed, penetrates a hole 72 in its base plate 50 and extends between the facing longitudinal edges 40 and 42 of the springs 36 and 38. Since the hole 72 is located on the longitudinal center line of the wiper blade 10, and the peg diameter 74 is greater than the width 46 of the intermediate bridge 34, it is ensured that the facing longitudinal edges 40, 42 of the springs 36, 38 always have clearance from the bridge 34. The wiper strip 20 is therefore suspended "swimming" freely, so to speak, between the springs 36, 38, and it can best adapt to the particular demands during the wiping operation. This also applies for the springs of the embodiments of the invention described below.

In another embodiment of the wiper blade according to the invention shown in FIGS. 6 through 8, everything applies that was stated for the embodiment described above, except for the hole 72 and the peg 70. For this reason, the same reference numbers used there are used for the same designs in FIGS. 6 through 8. In deviation from this, however, the end cap 148 according to FIGS. 6 through 8 are made out of an elastic plastic. A tongue 152 is situated alone in the base plate 150 of the end cap 148, which is connected as a single piece with an end wall 154 of the end cap 148 that faces the longitudinal end edges of the springs 36, 38. A peg 170 is situated on the open end of the tongue 152 that extends between the facing longitudinal edges 40, 42 of the springs 36, 38. The tongue 152 can be moved in the direction of the arrow 172 (FIG. 8) out of its operating position shown in FIG. 8 into an assembly position against a building retractive force that acts against the arrow 172. In this position, the peg 170 releases the two springs 36, 38 completely, so that the end cap 148 can be removed easily, because the two springs can now be moved so far toward each other that the shoulders 66 can no longer cooperate with the counter-shoulders 68. Conversely, the end cap 148 can also be installed easily on the springs 36, 38, of course, because this takes place with the peg 170 moved out accordingly, which does not come between the facing longitudinal edges 40 and 42 of the springs 36, 38 until the specified assembly position of the end cap 148 is achieved as a result of the retractive force, thereby also causing the shoulders 66 and 68 to conjugate. By arranging the peg 170 accordingly with regard for the longitudinal center line of the wiper blade and by adapting the width 174 of the peg 170 accordingly, the peg 170—which extends between the facing longitudinal edges 40, 42 of the springs 36, 38 when the end cap 148 is installed—holds these apart at a distance 44 that is greater than the width 46 of the intermediate bridge 34 (FIG. 3).

In the explanation of an embodiment of the wiper blade according to the invention to be described using FIGS. 9 through 11 below, the same statement regarding the reference numbers applies that was made previously in this regard about the embodiment according to FIGS. 6 through 8. In this embodiment as well, the end cap 248 is made out of a spring-elastic material, preferably plastic. Instead of the exposed flexible tongue 152 with the peg 170 in the embodiment according to FIGS. 6 through 8, two finger-like projections 256 (FIG. 9) that can be moved against spring force are situated on the end wall 254 that basically extend in the longitudinal direction of the wiper blade, and that lie under tension against the two facing longitudinal edges 40, 42 when the end cap 256 is installed on the springs 36, 38. As a result, they press the two springs so far apart that the distance 44 between the facing longitudinal edges 40, 42 of the two springs 36, 38 is greater than the width 46 of the intermediate bridge 34. These two projections 256 are adapted and arranged so that the specified operating position of the springs 36, 38 mentioned previously is permanently ensured here as well. As a result, the shoulders 66 of the projecting parts 62 grip behind the counter-shoulders 68 formed on the end cap 248 here as well. The particular advantage of this embodiment lies in the fact that the installation of the end caps is achieved using a single, straight-line attachment movement that can be performed easily using automatic assembly machines and that ends when the shoulders 66 conjugate with their counter-shoulders 68. The specified position of the springs 36, 38 in their longitudinal grooves 28, 30 of the wiper tip 20 is then reached as well.

Figure 12:
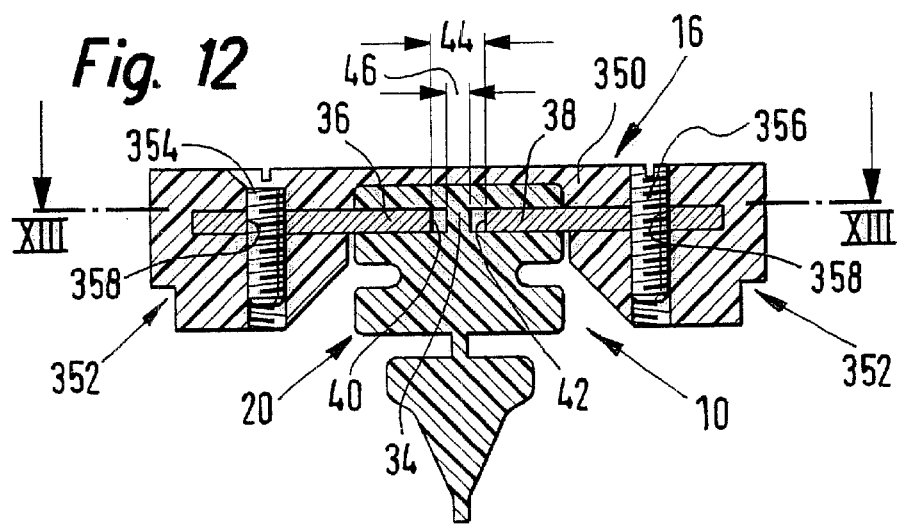
FIG. 12 shows an enlarged view of the section of a sectional drawing along the line XII—XII through the wiper blade according to FIG. 1.
Figure 13:
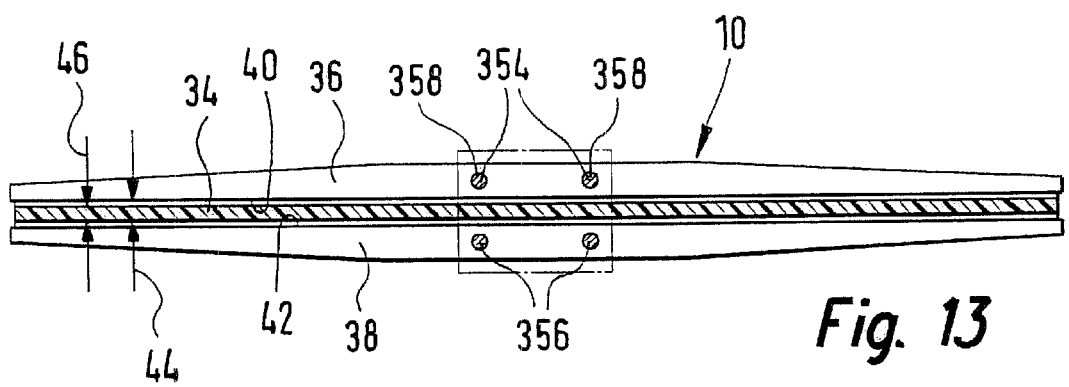
FIG. 13 shows a longitudinal section drawing along the line XIII—XIII through the wiper strip with visible springs and with a connecting device for the wiper arm indicated by the dash-dotted line, shown reduced in size.

Finally, a further embodiment of the wiper blade according to the invention is explained below using FIGS. 12 and 13. In the sectional drawing through the wiper blade 10 shown in FIG. 12, the sectional view of the connecting device 16 situated in the middle section is also evident. Apart from the specially-designed means by which the required articulation between the wiper arm and the wiper blade is achieved, the sectional view through the connecting device is similar to the sectional views according to FIGS. 5, 7 and 10 through the end caps 48 and/or 148 and/or 248. The connecting device 16 therefore has a base plate 350 as well that includes claw-like projections 352 that grip under side wall areas of the springs 36, 38 projecting out of the longitudinal grooves 28 and 30. The connecting device 16 can therefore be slid along on these spring areas in the manner of a carriage. As shown in FIG. 12 as well, the springs 36, 38 lie in their longitudinal grooves 28, 30 of the wiper strip 20 in such a way that the distance 44 between the facing longitudinal edges 40, 42 of the springs 36, 38 is greater than the width 46 of the bridge 34 remaining between the longitudinal grooves 28, 30. This specified position of the springs 36, 38 with regard for the bridge 34 is permanently ensured in that appropriate securing means are provided on the connecting device 16. In the design example, these are formed, for instance, by countersunk head screws 354 or headless pins 356 that penetrate the springs 36, 38 transversely to their longitudinal span in recesses 358 provided there. It is appropriate for these screws 354 and/or 356 to be attached in the connecting device 16 which is preferably made of plastic. In deviation from the screws shown in the design example, it is also feasible to replace them with alignment pins, grooved pins, or the like. As shown in FIG. 13, two screws are provided for each spring.

Since the top view shown in FIG. 13 applies for all of the embodiments of the wiper blade according to the invention described here, it is apparent that the end caps 48 and/or 148 and/or 248, and the connecting device 16 are situated on opposite sections of the spring that project out of the longitudinal grooves assigned to these. This can also be achieved when springs are lying completely in their longitudinal grooves in that, as viewed in the longitudinal span of the wiper blade 10, they are provided with short sections that are opposite to each other in pairs that project out of the longitudinal grooves and form the contact areas for the bridge-like components. The end caps 48 and/or 148 and/or 248, and the connecting device 16 therefore form bridge-like components that overlap the springs with their base plates 50 and/or 350 and lie against the longitudinal edges of the springs opposite to each other. It is also clearly evident that at least one securing means—peg 70 and/or peg 170 and/or projections 256 and/or screws 354, 356—are arranged on each of these previously-mentioned bridge-like components that maintain the specified distance 44, which is greater than the width 46 of the intermediate bridge 40. In the embodiments according to FIGS. 4 through 11, the means of securing the specified distance 44 between the facing longitudinal edges 40, 42 of the springs 36, 38 extend inward in such a way that they lie against the longitudinal edges. In the embodiment according to FIGS. 12 and 13, the means of maintaining clearance 354 and/or 356 are arranged on the connecting device 16 and grip in the recesses 358 of the respective spring 36, 38.

Figure 14:
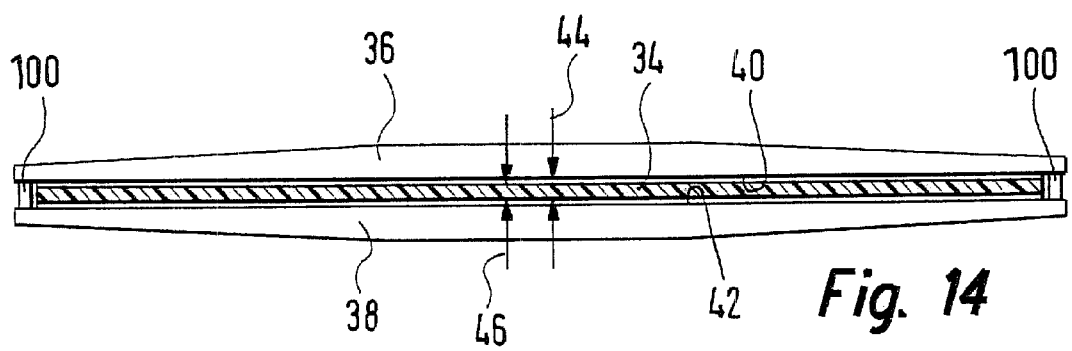
FIG. 14 shows the arrangement according to FIG. 13 without the connecting device, illustrating a design principle of the invention for the designs according to FIGS. 2 through 11.

FIG. 14 shows the principle of designs according to FIGS. 4 through 11, whereby the pegs 70 and/or 170, and the springs 256 are depicted nonfiguratively using means of maintaining clearance 100.

A common feature of all design examples is that the distance 44 between the facing inner longitudinal edges 40 of the two springs 36, 38 is greater than the width 46 of the intermediate bridge 34.

It is clear that the design according to FIGS. 12 and 13 can be easily combined with one of the designs according to FIGS. 4 and 5 and/or 6 through 8 and/or 9 through 11. It is also feasible to arrange further bridge-like components between the end caps according to FIGS. 2 through 11—independent of the design according to FIGS. 12 and 13—which can also include means of maintaining clearance. This is recommended in particular for very long wiper blades.

What is claimed is:
1. A wiper blade for motor vehicles windows, comprising an elongated rubber-elastic wiper strip having a wiper lip and two longitudinal sides with two longitudinal grooves located substantially in one plane so that between both longitudinal grooves a bridge is provided; a band-shaped elongated spring-elastic carrier element is defined by a pair of springs, the springs are accommodated in the longitudinal grooves so as to each extend with at least a section outwardly beyond a respective longitudinal groove, wherein with respect to a longitudinal center line of the wiper strip the sections are located opposite to one another to define facing and opposite longitudinal edges and at least on one of the sections a bridge-shaped component that overlaps both springs fits against opposite longitudinal edges of the springs, so that a distance between the facing longitudinal edges of the springs is greater than a width of the bridge to define a clearance, and means for maintaining the clearance is arranged on the component.

2. A wiper blade as defined in claim 1, wherein the two sections are end sections which project out of their grooves in a longitudinal direction and transversely to the longitudinal direction of the wiper strip; and further comprising an end cap serving as the bridge-shaped component and situated on the end sections, wherein the means for maintaining the clearance cooperate with the facing longitudinal edges of the springs and are situated on the end cap.

3. A wiper blade as defined in claim 2, wherein the end cap has a base plate situated on a side of the springs opposite to the wiper lip, wherein the base plate has L-shaped projections that extend in a longitudinal direction of the springs with one leg of each projection connected with the base plate and the other legs of the projections being opposite to each other, wherein the means for maintaining the clearance which extends between the facing longitudinal edges of the springs and is situated on the base plate.

4. A wiper blade as defined in claim 3, wherein said means for maintaining the clearance is formed by a peg held on the base plate.

5. A wiper blade as defined in claim 4, wherein the end cap is composed of a spring-elastic material, and the peg is situated on a tongue of the end cap that is movable out of an operating position into an assembly position against a retractive force.

6. A wiper blade as defined in claim 2, wherein the end cap has a wall opposite to longitudinal end edges of the springs, on which the means for maintaining the clearance are situated in a longitudinal direction of the springs and extend between the springs.

7. A wiper blade as defined in claim 6, wherein the end cap is composed of a spring-elastic material, and the means for maintaining the clearance is formed by two finger-shaped projections of a wall which is movable against spring force, which in an operating position of the end cap lie under tension against one of the two facing longitudinal edges of the springs.

8. A wiper blade as defined in claim 2, and further comprising a shoulder on each end section of each spring on their opposite longitudinal edges to which a counter shoulder of the end cap that cooperates with the shoulder is assigned.

9. A wiper blade as defined in claim 1, wherein the bridge-shaped component is formed as a connecting device for a wiper arm situated in a middle section of the wiper blade on a side of the springs opposite to the wiper lip, which includes projections that encompass outer longitudinal edges of the springs in a claw-shaped manner, wherein the means for maintaining the clearance is formed by means situated on the connecting device that grip into at least one recess of the respective spring.

10. A wiper blade as defined in claim 9 wherein the means that grip are formed by separate components held on the connecting device that penetrate the springs in recesses.

* * * * *